United States Patent [19]

Soderstrom et al.

[11] 4,189,273
[45] Feb. 19, 1980

[54] MODULAR WAREHOUSE CONVEYOR SYSTEM

[75] Inventors: Edward C. Soderstrom, Sparta; David L. Neu, Grand Rapids, both of Mich.

[73] Assignee: Rapistan Incorporated, Grand Rapids, Mich.

[21] Appl. No.: 889,660

[22] Filed: Mar. 24, 1978

[51] Int. Cl.² .............................................. B65G 1/06
[52] U.S. Cl. ..................................... 414/285; 198/367
[58] Field of Search .............. 214/11 R, 16 B, 16.4 R, 214/16.4 A; 198/367, 372; 186/1 AR, 1 AE, 1 M; 414/285

[56] References Cited

U.S. PATENT DOCUMENTS

| 3,734,311 | 5/1973 | Thompson et al. | 214/16.4 A |
| 3,983,988 | 10/1976 | Maxted et al. | 198/367 X |

*Primary Examiner*—Robert G. Sheridan

*Attorney, Agent, or Firm*—Price, Heneveld, Huizenga & Copper

[57] ABSTRACT

A modular conveyor system for use in a warehouse having a plurality of elongated, multi-level order selection racks includes a plurality of powered picking conveyors supported in vertically spaced superimposed relationship, a plurality of accumulator conveyors supported above the picking conveyors in a common horizontal plane, a merge conveyor sequentially receiving a batch of articles from the accumulator conveyors and discharging the articles onto a sortation conveyor. The sortation conveyor includes a plurality of article diverters for automatically diverting predetermined articles from the batch onto a plurality of discharge conveyors. A palletizer station positioned adjacent each of the discharge conveyors includes a storage area for a plurality of pallets and a lift to transfer a loaded pallet to a run out conveyor which permits the pallet to be transferred to a truckloading area.

13 Claims, 15 Drawing Figures

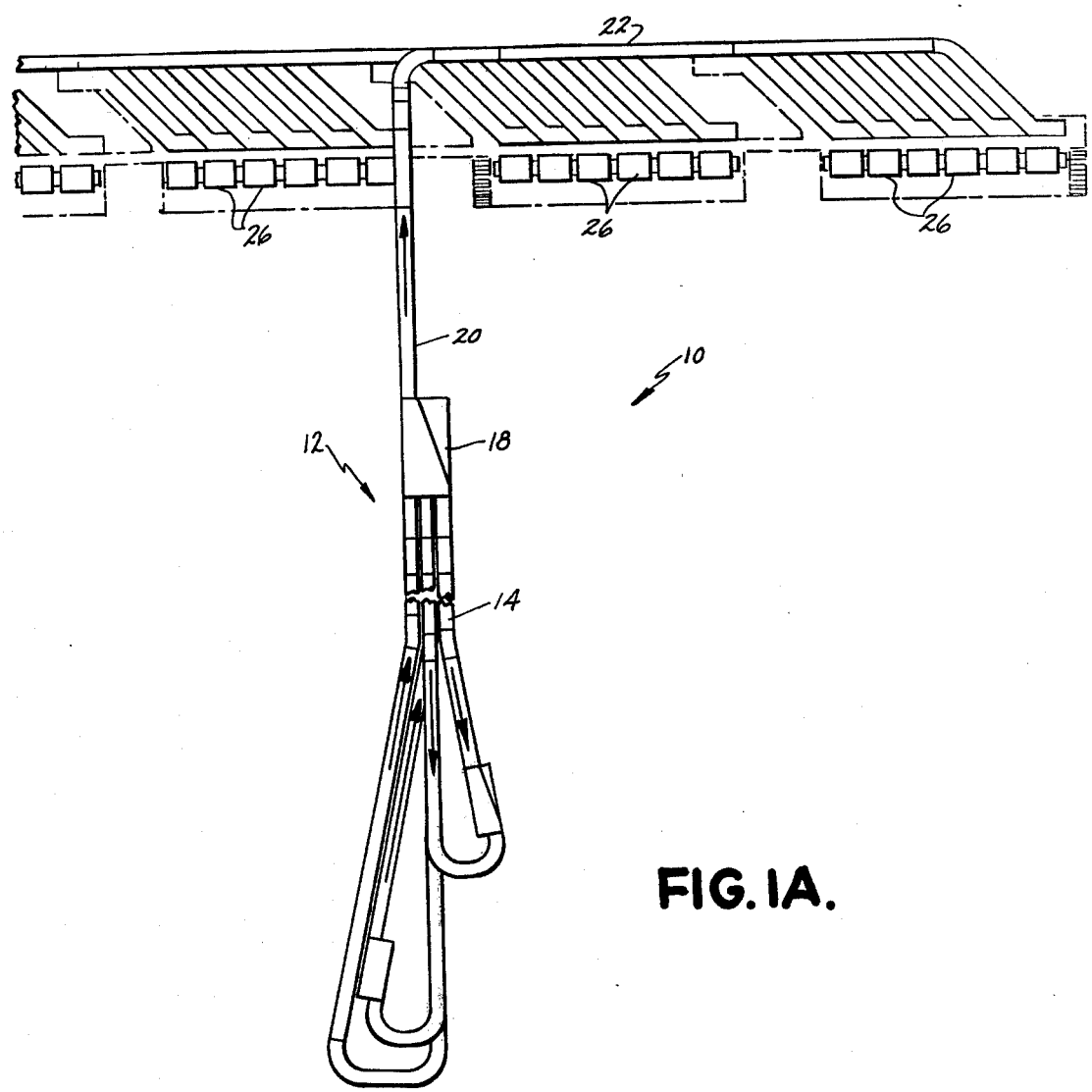
FIG. IA.

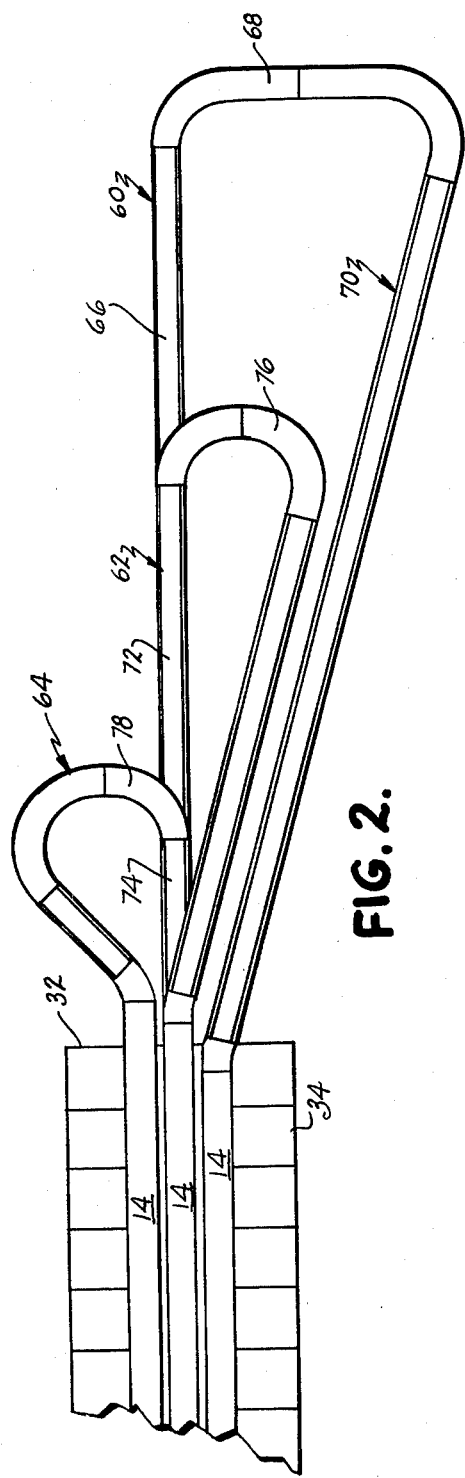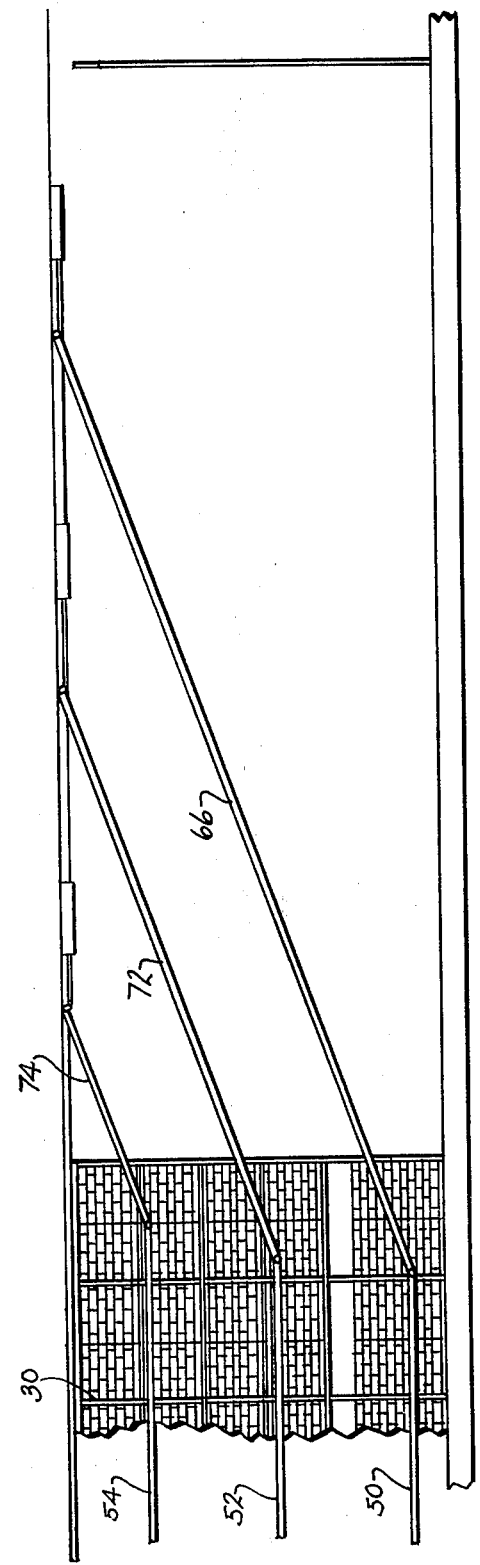

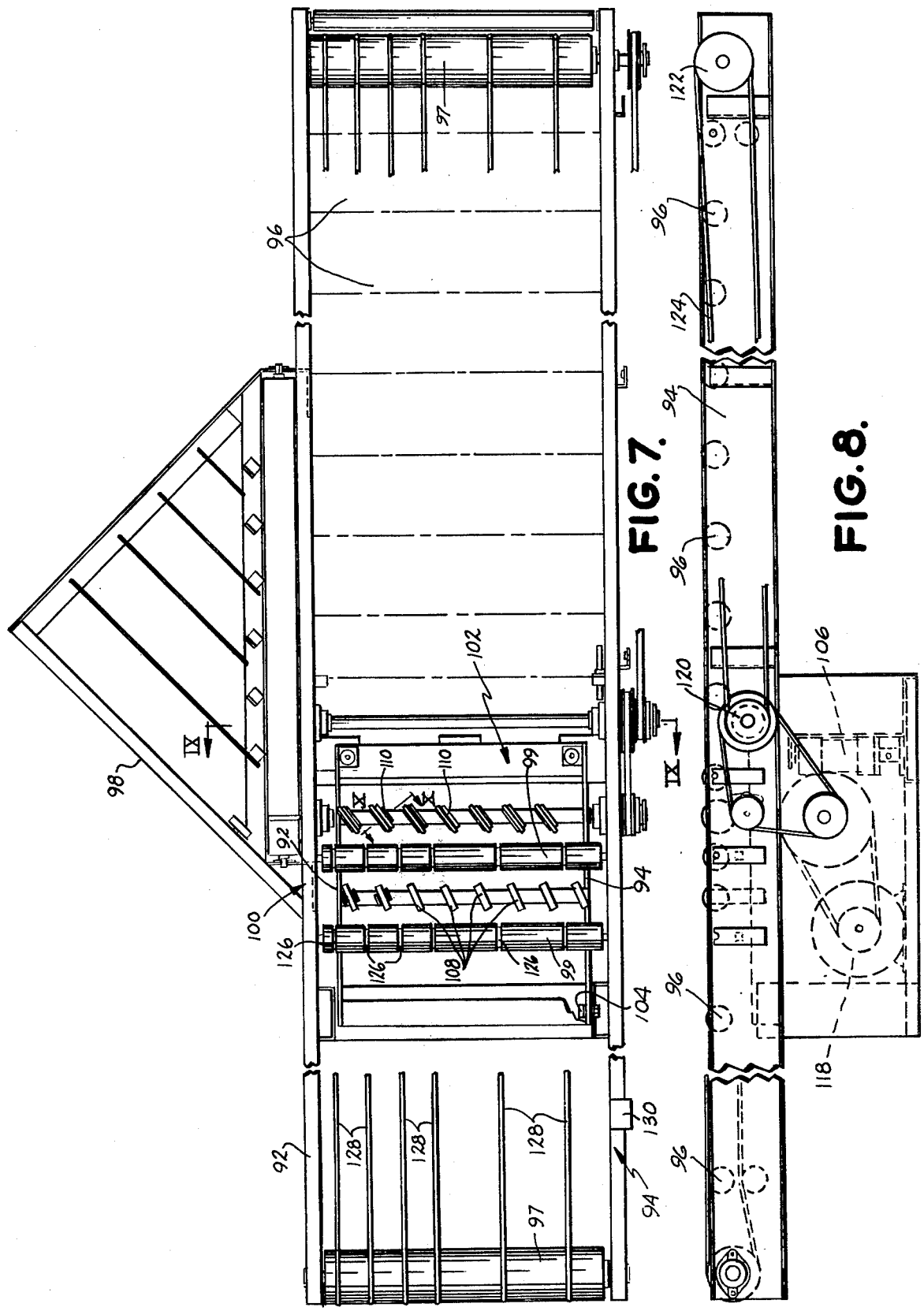

MODULAR WAREHOUSE CONVEYOR SYSTEM

BACKGROUND OF THE INVENTION

The present invention relates to warehousing systems and more particularly, to automated or semi-automated conveyor systems for warehouses.

Heretofore efforts have been made to increase the efficiency of warehousing systems in filling of orders from a variety of stores and delivering these items from a plurality of storage racks to a proper location or loading dock.

An example of one prior system may be found in commonly owned U.S. Pat. No. 3,734,311 entitled WAREHOUSE APPARATUS AND METHOD WITH ARTICLE LABEL PRINTING MEANS and issued on May 22, 1973 to Thompson et al. The system disclosed therein includes a plurality of parallel, spaced storage racks and a mobile picking unit. The picking unit includes an operator platform movable vertically to place it in register with the various levels of the racks. The articles are picked and a destination code is placed therein. The articles are then placed on a pivotable elevator conveyor and directed to an output conveyor. The articles may then be conveyed to a sortation conveyor. The sortation conveyor typically includes a plurality of diverter mechanisms and a control system to sense the destination code and activate the appropriate diverter to divert the articles to a predetermined loading or marshalling area.

If the conveyor systems are designed as an integral part of the warehouse, various problems may be experienced relating to efficiency of operation, full use of available manpower and ability to readily adapt to expansion of the warehouse facility. One form of integrated warehouse system includes a vertical lift for depositing an automatic picker cart on one of a plurality of vertically spaced tracks extending along opposed rows of storage racks. The picker carts are programmed to proceed along the tracks to a pre-programmed location, remove a pallet of articles and return to the vertical lift. This type of system is not readily adapted to "batch" picking wherein orders for several stores are picked at one time. An integrated design approach is automated or semi-automated warehousing may require specialized conveyor structures especially adapted for the space available and the type of rack structures employed. Maximum versatility in both batching of orders and in use of order selection personnel will generally not be obtained. The systems presently available have not been readily adapted to existing warehouses of the type including a plurality of parallel, elongated rows of multiple level storage racks. Also existing systems, as set forth above, are not easily expanded should the number of storage racks be increased after installation of the original system.

SUMMARY OF THE INVENTION

In accordance with the present invention a unique, modular conveyor system is provided which is readily adapted for installation into existing warehouse facilities, which may be employed to meet increased conveyor needs due to warehouse expansion and by which the problems heretofore experienced may be substantially eliminated. The unique modular conveyor system is adapted for installation in a warehouse storage area including a plurality of elongated, multi-level order selection racks. The system includes a plurality of powered, picking conveyors supported in a vertically spaced, superimposed relationship and positioned between opposed rows of order selection racks. A plurality of accumulator conveyors are connected to each of the picking conveyors. The accumulator conveyors feed onto a merge conveyor which sequentially receives a batch of articles and discharges each of the batches onto a common sortation conveyor. The sortation conveyor includes a plurality of diverter means for selectively diverting predetermined articles to one of a plurality of discharge conveyors. A palletizing station is included at each discharge conveyor at which a worker may transfer the articles to a pallet and the pallet may be discharged onto a run out conveyor and then transferred to a loading area.

A plurality of the modular conveyor systems may be readily installed into existing warehouse facilities or used to expand the conveyor capacity required by an increase in the number of available storage racks.

BRIEF DESCRIPTION OF THE DRAWINGS

FIGS. 1 and 1a are a plan view of a conveyor system for a warehouse including a plurality of the modular conveyors in accordance with the present invention;

FIG. 2 is the top plan view of a portion of the modular conveyor system as installed between opposed rows of storage racks;

FIG. 3 is a side, elevational view of the portion of the modular conveyor system of FIG. 2;

FIG. 7 is a top plan view of a diverter means included in the modular conveyor system;

FIG. 8 is a fragmentary, side elevational view of the diverter of FIG. 7;

DETAILED DESCRIPTION OF THE PREFERRED EMBODIMENT

Figure 1:
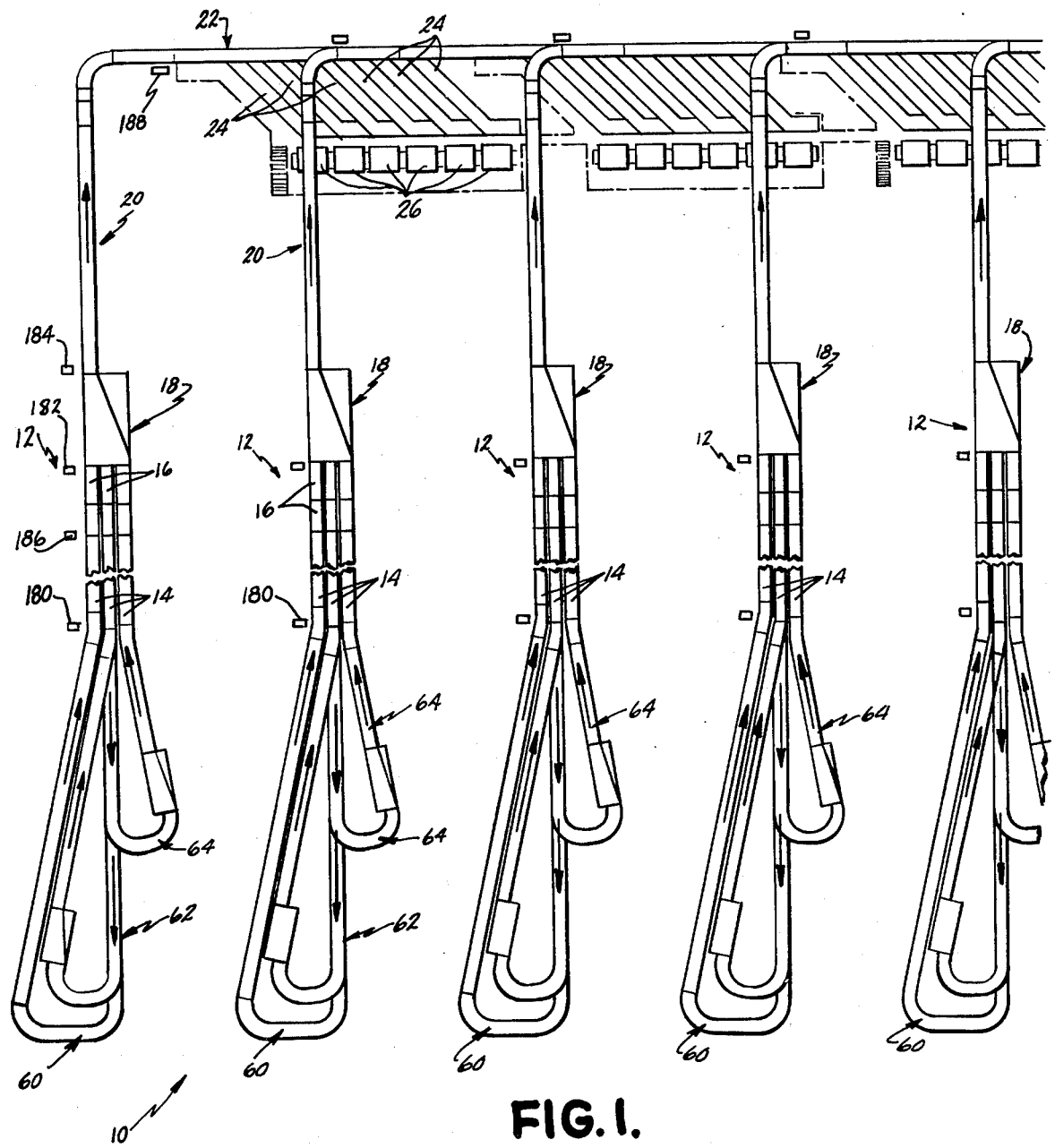

An automated or semi-automated conveyor system adapted to a warehouse of the type having a plurality of elongated, multi-level storage racks is illustrated in FIGS. 1 and 1a and generally designated 10. The warehouse conveyor system includes a plurality of modular or subconveyor systems generally designated 12. Each modular system extends between a pair of opposed rows of storage racks and includes a plurality of accumulator conveyors 14, indexing or meter belts 16, a merge conveyor 18, a powered belt decline conveyor 20, a sortation conveyor 22, a plurality of discharge conveyors 24 and a plurality of palletizer lift stations 26.

Figure 4:
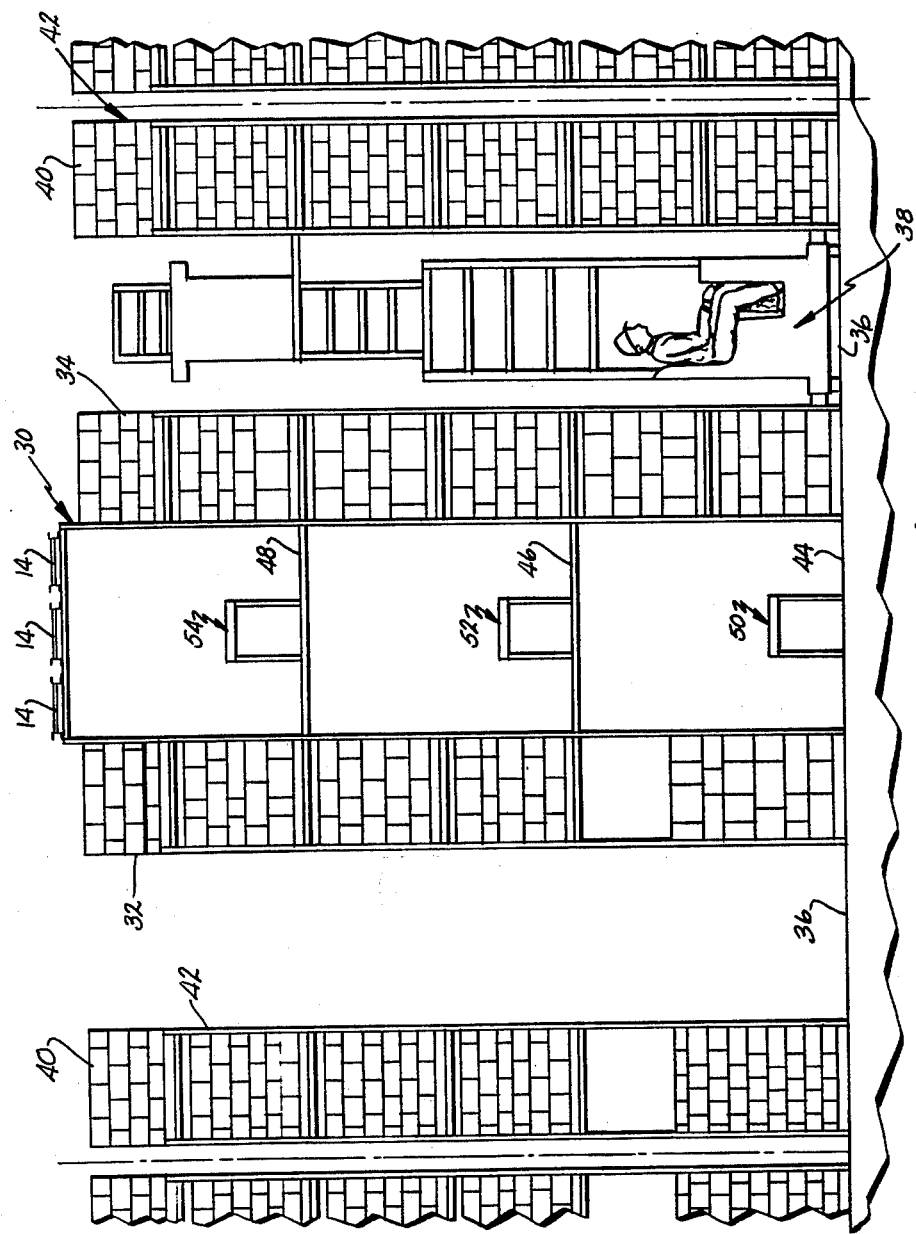
FIG. 4 is a vertical, cross-sectional view of the modular conveyor system showing the picking conveyors and accumulator conveyors supported in vertical relationship between opposed rows of storage racks.

As best seen in FIGS. 2, 3 and 4, each modular conveyor system 12 also includes a multi-level rack structure 30 positioned between opposed rows of storage racks 32, 34. The storage racks 32, 34 are of the multi-level type and are divided into individual bays into which articles are placed for storage and picking. The racks are positioned on the warehouse floor space so as to define aisles 36 through which narrow aisle replacement vehicles 38 may pass to remove replacement pallets 40 from rack structures 42 and transfer them to the appropriate level on the stock racks 32, 34. Each of the bays of the racks will contain cartons of a specific product and the location of that product may be referred to be level and bay number, slot number and aisle side, or the like.

The rack structure 30 defines a ground level 44, an intermediate walkway level 46 and an upper walkway level 48. Extending the length of the racks 32, 34 are a plurality of powered, belt type picking conveyors 50, 52 and 54. The picking conveyors, as seen in FIG. 4 are supported on the respective levels or zones of the rack 30. As seen in FIG. 3 the picking conveyors 50, 52 and 54 extend to the end of the rows of racks 32, 34 and discharge articles placed thereon onto generally U-shaped intermediate transfer conveyors 60, 62 and 64. Transfer conveyor 60 includes a first, upwardly angled powered portion 66 which conveys articles from picking conveyor 50 upwardly to horizontal second and third portions 68, 70. In a similar manner, intermediate transfer conveyors 62 and 64 include upwardly angled portions 72, 74, respectively, which convey articles from their respective picking conveyors to horizontal sections 76, 78. The intermediate transfer conveyors discharge articles placed on the picking conveyors onto a respective one of the accumulator conveyors 14. This is clearly shown in FIG. 2.

Order selection personnel will start at one end of one of the racks 32, 34 on their respective levels, walk the length of the respective picking conveyors, 50, 52 and 54 and deposit articles from the storage racks onto the picking conveyors. Each of these workers will preferably have been given one "batch" of orders indicated on preprinted labels prepared for each picking zone. A label is manually affixed to each of the selected cases or articles supported on the racks. The labels, as explained below, are preferably of the coded type and actuate a predetermined diverter means to discharge the article to the appropriate palletizing station.

In this manner, the worker will select articles for ultimate shipment to different stores. Accumulators 14 may be of the type illustrated and described in commonly owned U.S. Pat. No. 3,768,630 to Inwood et al, entitled ACCUMULATOR WITH AUTOMATIC OVERRIDE and issued Oct. 30, 1973. The accumulators 14 function to "accumulate" cartons or articles adjacent the inlet to the index or metering belts 16. These conveyors are operable to deposit the articles one at a time onto the index belts.

The merge conveyor 18 may be of a conventional type and will receive articles deposited thereon from a respective one of the accumulators 14 and indexing belts 16 and merge these articles or cartons onto the decline conveyor 20. An example of the merge conveyor suitable for use in the modular system in accordance with the present invention may be found in commonly owned U.S. Pat. No. 4,044,897 to Wesley R. Maxted, entitled CONVEYOR SORTING AND ORIENTING SYSTEM and issued on Aug. 30, 1977.

Figure 5:
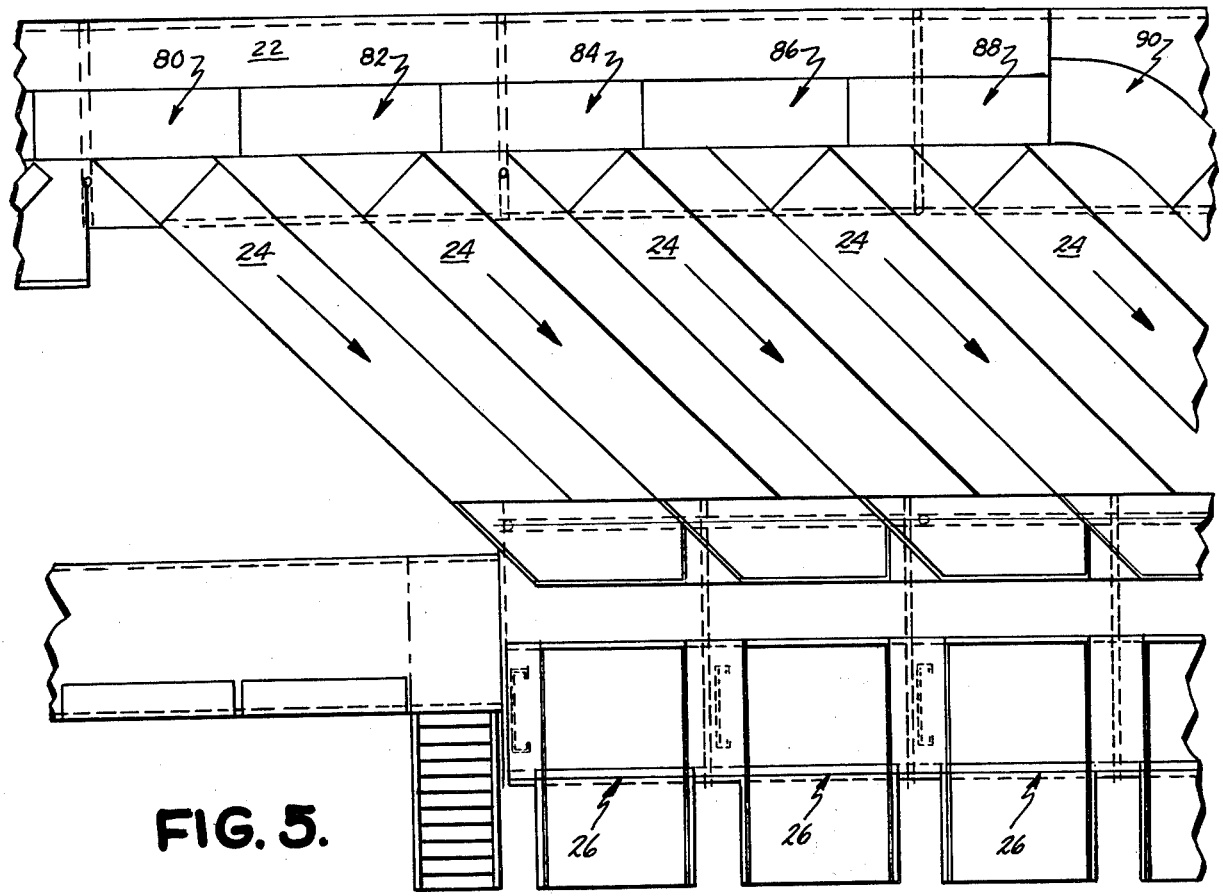
FIGS. 5 and 5a are a top plan view of a portion of the modular conveyor system showing the diverter zones, discharge conveyors and palletizing stations.
Figure 11:
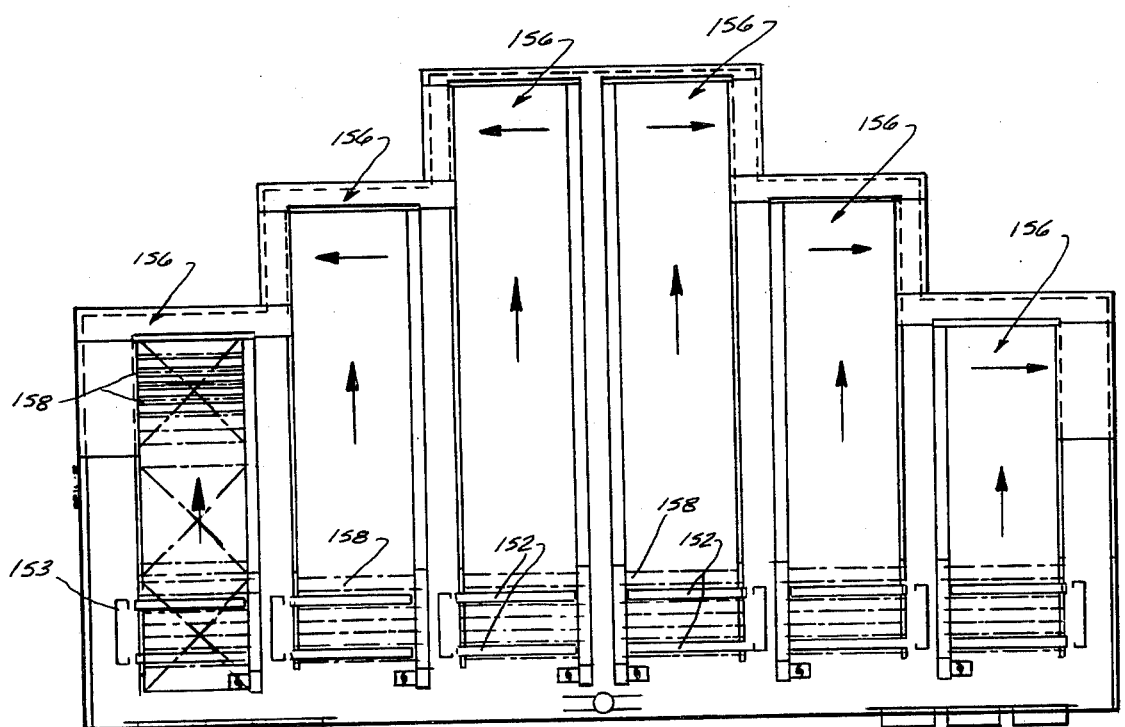
FIG. 11 is a fragmentary, plan view of ground level portion of the picking station showing the run out conveyors incorporated in the present invention.
Figure 5A:
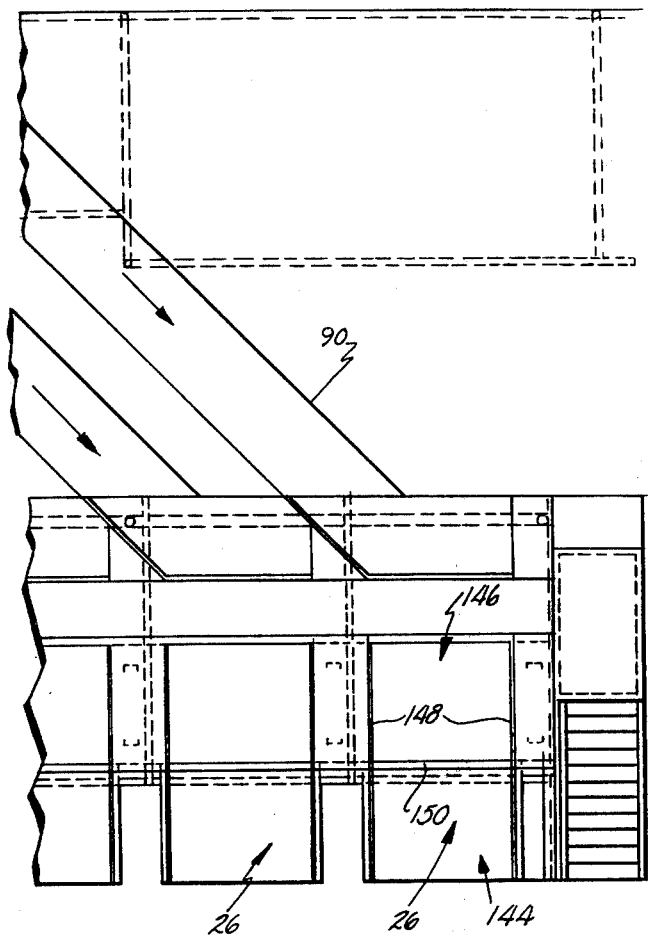
Figure 10:
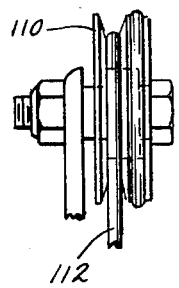
FIG. 10 is a cross-sectional view taken generally along line X—X of FIG. 7.

As articles are released onto conveyor 20 from the accumulator conveyors, they pass downwardly to a sortation conveyor 22. As shown in FIG. 5, the sortation conveyor includes a plurality of diverter zones 80, 82, 84, 86 and 88. The sortation conveyor 22 also includes a run out conveyor 90 to receive articles which are not diverted onto one of the plurality of discharge conveyors 24.

Figure 9:
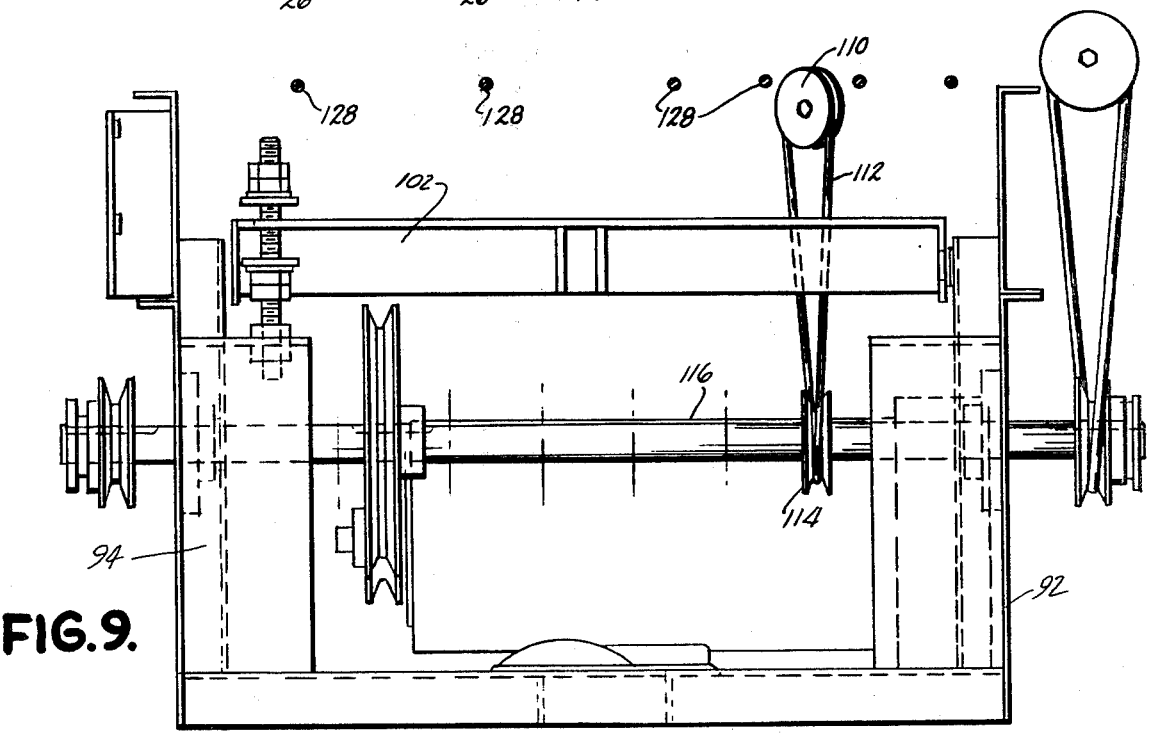
FIG. 9 is a cross-sectional view taken along line IX—IX of FIG. 7.

The diverter zones 80, 82, 84, 86 and 88 may be defined by modular, take off diverter means illustrated in FIGS. 7, 8, 9 and 10. As best seen in FIG. 7, the modular diverter means each include a pair of parallel, side members 92, 94. Extending between the parallel side members 92, 94 in spaced, parallel relationship are a plurality of rollers 96 and end rollers or end pulleys 97. In order to simplify the drawing, only the end rollers 97 have been illustrated and rollers 96 are only schematically shown. An angled conveyor section or portion 98 extends outwardly from side member 92 intermediate the ends thereof. Positioned upstream and adjacent the angled portion 98 is a diverter mechanism 100. The diverter mechanism 100 includes a pivotally mounted sub-frame 102 which is attached by pins 104 to the side frames 92, 94. At least a pair of rollers 99 extend between the side frames 92, 94. As seen in FIG. 8, an actuator 106 raises the sub-frame 102 from an inoperative to an operative position. Supported on the sub-frame 102 is a first set of skewed wheels 108. Positioned downstream from the first set of skewed wheels 108 is a set of powered, skewed wheels 110. As seen in FIG. 9, each of the skewed wheels 110 is driven by a belt 112 extending around the wheel 110 and around a pulley 114 supported on a driven shaft 116. As seen in FIG. 8, a suitable power source or motor 118 is provided to drive the shaft 116. Also, the motor 118 is connected at one of the end rollers 97 through pulleys 120, 122 and a belt 124. As an alternative or in addition, a conventional flat belt drive (not shown) may be included to drive rollers 96 to insure that sufficient drive force is generated to convey a carton past the diverter 100.

As seen in FIG. 7, each of the rollers 97 and rollers 99 include a plurality of circumferential grooves 126. Elongated, endless, resilient "O"-ring type bands 128 encircle the end rollers 97 and are received within the grooves 126. The grooves 126 are equally spaced with respect to each of the rollers 97 so that the bands 128 extend in spaced, parallel relationship with each other and with the side members 92, 94 of the diverter zone over rollers 99. The bands 128 more efficiently convey the articles through the diverter zone, assist in preventing skewing or misorientation of the articles and power the intermediate rollers 96 and the end rollers 97. The first wheels 108 are skewed at an angle less than the angle at which the powered wheels 110 are skewed. As the sub-assembly or frame 102 is shifted to its operating position, powered wheels 110 will be positioned above the rollers 96 a distance greater than that of the non-powered wheels 108. The diverter mechanism progressively raises, rotates and transports the articles to the angled section 98 and then to the respective discharge conveyor 26.

The diverter mechanism illustrated in FIGS. 7-10 operates in basically the same manner as the conveyor diverter disclosed in commonly owned U.S. Pat. No. 3,983,988, entitled CONVEYOR DIVERTER and issued on Oct. 5, 1976 to Wesley R. Maxted and Bernard H. Woltjer. As discussed therein, a photoelectric detector 130 or address code sensor may be positioned upstream of the diverter wheels 108, 110. The photoelectric detector 130 will "read" the retro-reflective or coded label placed on the article or carton by the order selection personnel. If the code on the label coincides with the predetermined code for the diverter section or zone, the actuator 106 will be activated and the wheels 108, 110 will "pop up" and divert the carton to its respective discharge conveyor 26. To the extent necessary, the disclosure of U.S. Pat. No. 3,983,988 is hereby incorporated by reference.

Figure 6:
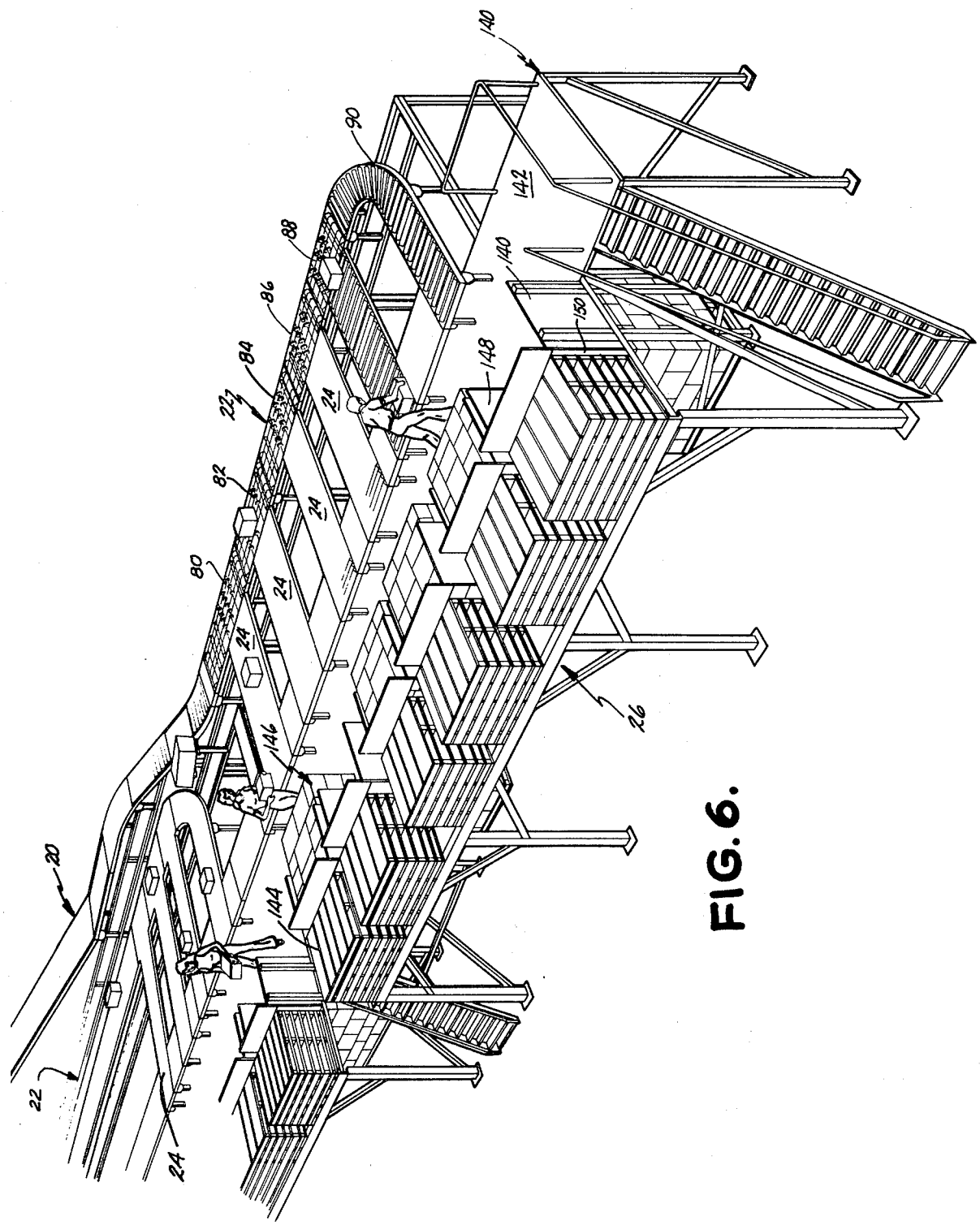
FIG. 6 is a perspective, fragmentary view showing the palletizing stations and discharge conveyors of adjacent, modular conveyor systems.

As seen in FIG. 6, the gravity conveyor 20 of an adjacent modular system 12 will overlap the sortation conveyor 22 of the previous system. It is presently preferred that the sortation conveyors 22 all be supported above the ground level of the warehouse on a mezzanine or platform structure 140. The mezzanine structure 140 provides a working area 142 at which personnel may unload the cartons from their respective discharge conveyors 24 and place them on a pallet at the appropriate palletizing station 26. Each palletizing station 26 includes a pallet storage area 144 and a pallet loading area 146. A pallet is supported by a lift at the pallet loading area 146. Once the pallet is loaded, it is lowered to ground level and discharged onto a run out conveyor for transport to an appropriate truck loading zone.

Figure 12:
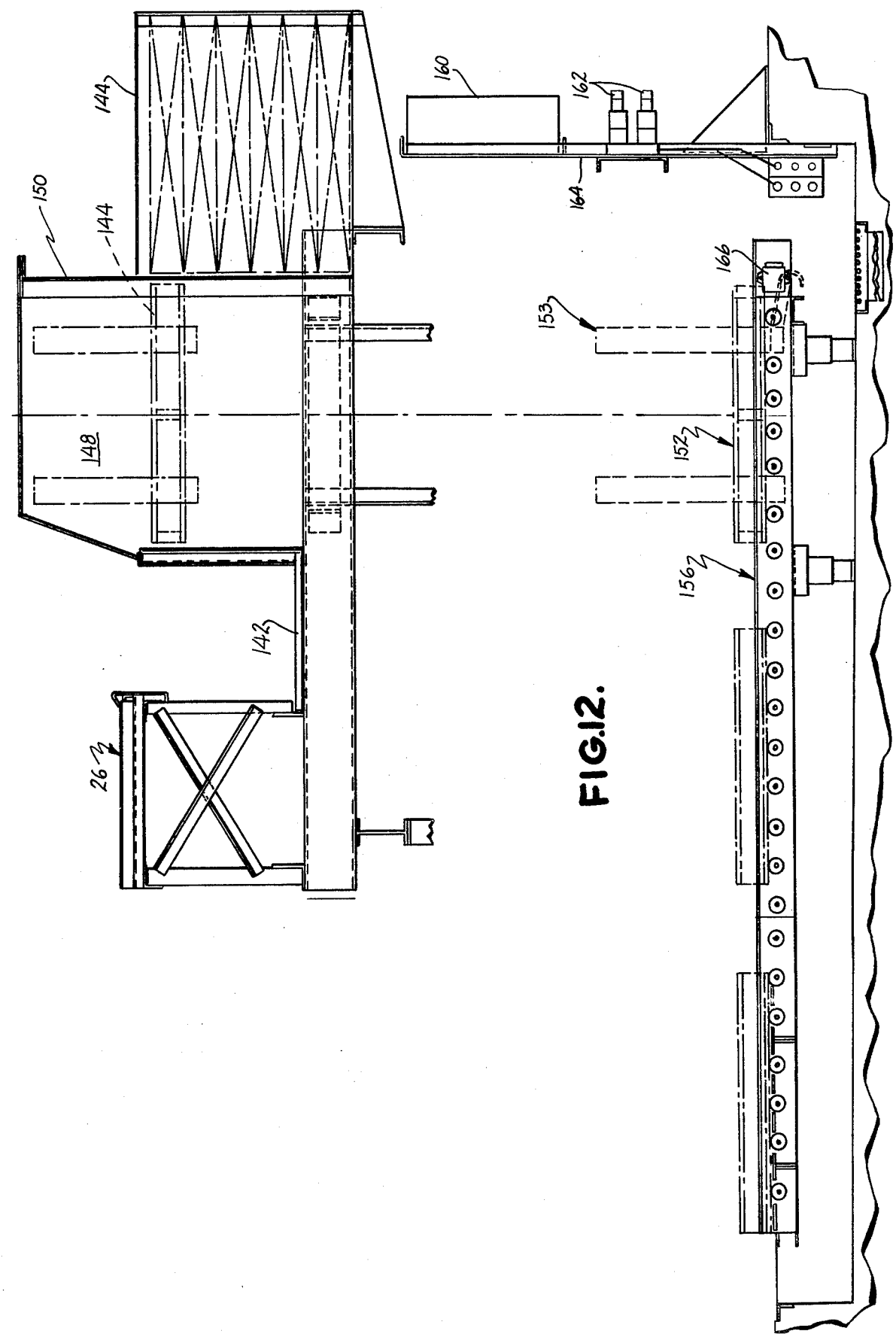
FIG. 12 is a fragmentary, side elevational view of a palletizing station.
Figure 13:
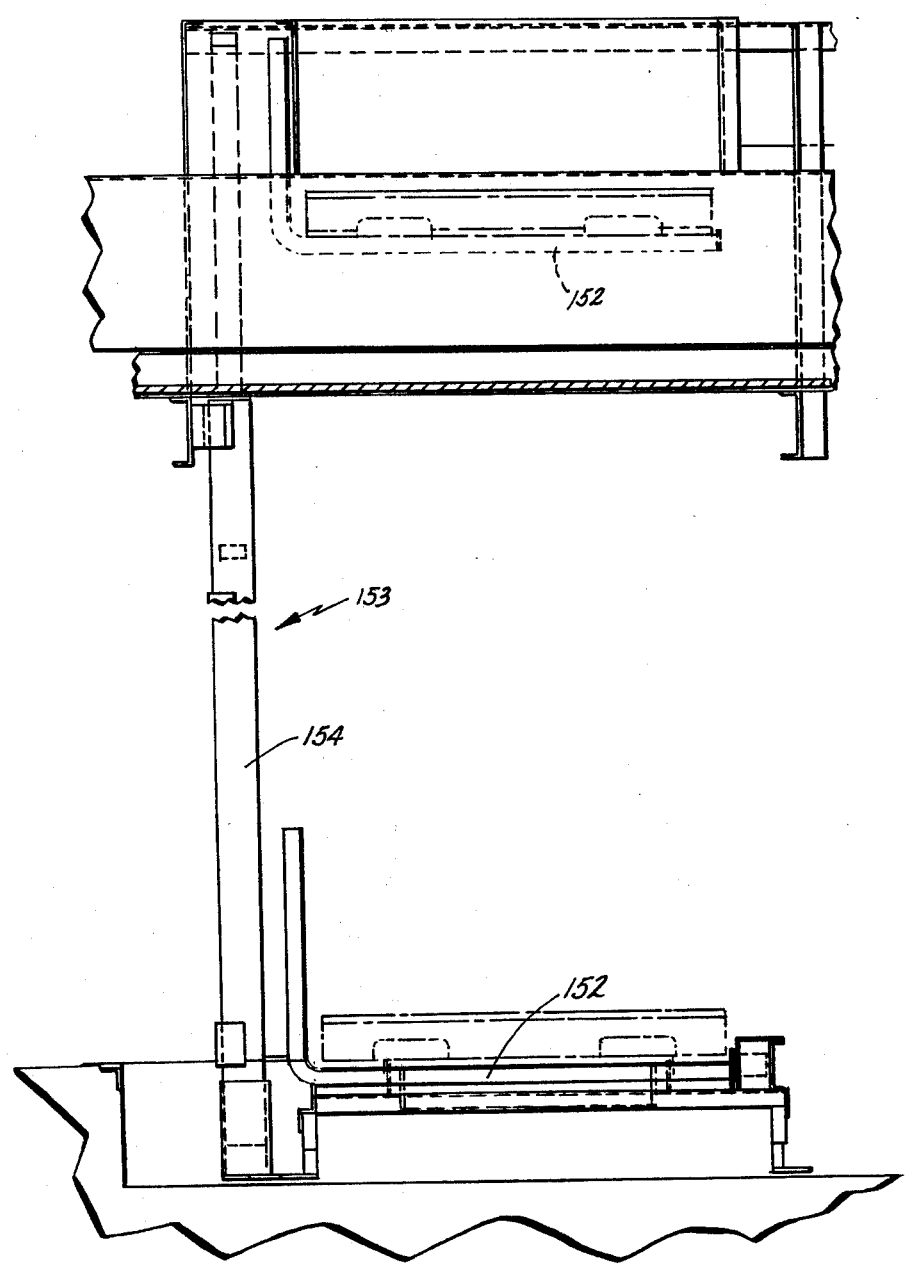
FIG. 13 is a fragmentary, front elevational view of a portion of the palletizing station showing the run out conveyor and the lift mechanism.

As seen in FIGS. 6, 12 and 13, each palletizing loading area 146 is defined by side walls 148 and a rear wall 150. The walls 148 and 150 assist in properly stacking the cartons on the pallet. The pallet to be loaded is supported on a lift platform 152 as seen in FIG. 13. The lift platform 152 is raised and lowered by a conventional, hydraulic piston and chain type lift mechanism 153. This lift is of a conventional nature and has not been illustrated in detail in the drawings. It is preferred that the hydraulic lift, however, be controlled by a light source and photocell system which will lower the platform incrementally as each layer of cartons is placed on the pallet so as to reduce pallet loader fatigue and to maintain the level at which loading is done at approximately waist height. Once the pallet is fully loaded, it is lowered by the lift 153 which rides within rails 154 to a pallet run out conveyor 156. The pallet run out conveyor 156 preferably includes a plurality of powered rollers 158. A control panel 160 may be conveniently located adjacent each of the lifts and suitable hydraulic valving 162 may be provided on the panel support 164 for controlling the hydraulic motor 166 of the run out conveyor and for controlling the lift 153.

As should now be readily apparent, each individual modular conveyor system is readily adapted for installation into conventional warehouses including elongated, parallel rows of multi-level storage racks. Should the warehouse space be expanded, additional modular systems may be installed to handle the expanded areas. The modular concept increases the ease and efficiency of manufacture of warehouse conveyor systems due to standardization of conveyor sections. The systems are easily and readily installed and the problems heretofore experienced with specialized installation due to integrated design concepts are essentially eliminated.

OPERATION

It is presently preferred that the sortation conveyors 22 and the palletizing stations be positioned in a warehouse adjacent the truck shipping doors of the warehouse. Within each of the modules between the opposed rows of racks 32, 34 an order selector will begin his picking cycle at the shipping end of one side of the picking conveyor. The order selector will manually remove a carton or article and affix thereto are preprinted address label. Preferably, the products supported on the racks are assigned to rack locations within the picking zones by select groups. These select groups may be identified either through computer generated instructions, assigned picking slots at the end of each select group or by a simple change in rack color at the end of each select group. The last case or carton of the particular select group when placed on the picking conveyor is marked by the order selector with a retro-reflective label. This label is used to identify successive select groups at entry onto the accumulators 14 and at the meter index belts 16 prior to release to the palletizing stations. After making a full circuit or cycle of the picking zone, the selector will place an empty tote box on the picking conveyor. The tote box identifies the end of the batch order and may be used to control the merge operation. The selector will only place the cases on the picking conveyor when it is running.

The cartons are conveyed to a horizontal elevation in the same plane as the accumulator conveyors by intermediate transfer conveyors and will accumulate on the rack supported conveyor 16. It is presently preferred that a start/stop push button station be provided at the end of each picking conveyor to permit the selector to stop or start his picking conveyor and associated transportation or intermediate conveyors. Also, it is preferred that an emergency pull cord be provided the full length of the picking conveyor to stop it in an emergency situation.

A photoelectric detector 180 positioned adjacent the entrance to the accumulator conveyor (FIG. 1) may be employed to "read" the retro-reflective label on the last package of the select group to indicate when a complete select group is present on the accumulator. It is preferred that the control system sequentially release the batch orders from a respective accumulator 14 onto the indexing belt 16 and then onto the merge conveyor 18 in a predetermined sequence. It is presently preferred that the accumulators be released in sequence with the floor level zone being released first, then the intermediate level zone and finally the upper level zone. The retro-reflective label on the last case of the select group will also indicate to the control system through detectors 182, 184 adjacent the inlet and outlet of the merge conveyor when a complete select group has passed through the merge section. When the tote box placed on the picking conveyor by the selector reaches a detector 186 at a meter 16 prior to the merge conveyor, the meter belt will stop and the belts will be "locked out." This tote signals the end of the batch for that particular picking zone. When all three totes have reached a respective meter belt, the lock out condition may be relieved and the totes released in the same release sequence used for the picking zones. When a tote box reaches the label scanner or photoelectric detector 130 adjacent the first of the diverter zones, it is preferred that the control system stop all of the conveyors back to and including the merge conveyor. It is preferred that these systems be stopped until all the cases from the preceding batch have been removed from the gravity run out lines, palletized, lowered and discharged at floor level and new pallets are properly positioned at each palletizing station.

A control panel is preferably mounted adjacent each of the palletizer stations to permit a worker to depress a push button to thereby restore power to the individual module. Since the tote boxes do not have an appropriate destination or address label thereon, they will exit from the sortation conveyor on run out line 90.

As an alternative to the use of separate address scanners to activate each of the diverter mechanisms, each of the articles may have placed thereon a pre-printed code label which will be read by a scanner 188 (FIG. 1) at the entrance of the sorter conveyor. The code may then be entered into a memory which will automatically activate the predetermined diverter mechanism when the carton reaches the appropriate discharge conveyor. A control system of this type is described in the aforementioned U.S. Pat. No. 4,044,897. To the extent necessary, the disclosure of this patent is hereby incorporated by reference.

As should now be readily apparent to those of ordinary skill in the art, the modular conveyor system in accordance with the present invention is readily adapted to existing warehouse structures without substantial modification. The system adapts to warehouse expansion and results in reduced manufacturing cost and installation expense. Maximum use of manpower is obtained through the use of the three level or multi-zone picking conveyors, accumulators, automatic sequencing to the merge conveyors and then to the sortation conveyors and palletizing stations. Various modifications to the system as presently disclosed will undoubtedly now become apparent to those of ordinary skill in the art. For example, the number and levels of picking conveyors and the number of accumulation conveyors may be increased or decreased beyond that illustrated. As expressly intended, therefore, the above description should be considered as that of the preferred embodiment. The true spirit and scope of the present invention will be determined by reference to the appended claims.

The embodiments of the invention in which an exclusive property or privilege is claimed are defined as follows:

1. A modular conveyor system for use in a warehouse storage area of the type including an elongated, multi-level order selection rack, said system comprising:
   a plurality of powered picking conveyors supported in vertically spaced, superimposed relationship adjacent said order selection rack, one of said picking conveyors being positioned at each level of said rack;
   a plurality of accumulator conveyors supported above said picking conveyors in a common horizontal plane, each of said accumulator conveyors being connected to one of said picking conveyors for receiving a batch of articles placed thereon;
   a merge conveyor for sequentially receiving a batch of articles from said accumulator conveyors and discharging each of said batches at a common outlet;
   a sortation conveyor for receiving a batch of articles from said merge conveyor at said common outlet, said sortation conveyor including a plurality of diverter means for selectively diverting articles from said sortation conveyor;
   a plurality of discharge conveyors, one adjacent each of said diverter means for receiving articles from said sortation conveyor; and
   a plurality of palletizer stations, one adjacent each of said discharge conveyors, said palletizing stations each including means for holding a pallet to be loaded and means for discharging a loaded pallet to a loading area.

2. A modulator conveyor system as defined by claim 1 wherein said picking conveyors each include a first powered section extending in a horizontal plane adjacent a level of said rack, a second powered section extending at an angle upwardly to the horizontal plane of said accumulator and a third powered section extending from said second section to a respective one of said accumulators in the same horizontal plane of said accumulators.

3. A modular conveyor system as defined by claim 2 further including an index belt conveyor positioned between said accumulator conveyors and said merge conveyor for indexing a batch of articles onto said merge conveyor.

4. A modular conveyor system as defined by claim 2 wherein said sortation conveyor includes a first decline conveyor section receiving a batch of articles from said merge conveyor and a second powered roller conveyor section, said second section including said diverter means.

5. A modular conveyor system as defined by claim 4 wherein said sortation conveyor is supported on a rack structure.

6. A modular conveyor system as defined by claim 5 wherein each of said palletizing stations includes a worker platform supported adjacent said discharge conveyor and wherein said means for holding a pallet to be loaded includes a lift for transferring a pallet from a position adjacent said work platform to ground level, said means for discharging a loaded pallet to a loading area being at ground level and positioned to receive a pallet from said lift.

7. A modular conveyor system as defined by claim 6 wherein said means for discharging a loaded pallet comprises a powered roller conveyor.

8. A conveyor warehousing system for batching orders and delivering said orders to selected loading areas from a plurality of elongated, multi-level storage racks, said storage racks being arranged in parallel rows within the warehouse, said system comprising:
   a plurality of modular conveyor means extending between opposed rows of said storage racks for receiving articles manually removed from said racks and conveying said articles to palletizing stations for loading onto pallets and subsequent delivery to said selected loading areas, each of said modular conveyor means including:
   a multi-level rack and platform extending the length of an opposed row of said storage racks and providing a picking walkway adjacent each level of said storage racks;
   a plurality of powered picking conveyors, one on each level of said rack and platform for conveying articles placed thereon;
   a plurality of accumulator conveyors equal in number to said picking conveyors, said accumulator conveyors being supported by said rack and platform in a common horizontal plane above said picking conveyors, each of said accumulator conveyors receiving and holding a batched order of articles from a respective one of said picking conveyors;
   a merge conveyor for selectively receiving a batched order from one of said accumulator conveyors; and a sortation conveyor for receiving a batched order from said merge conveyor and delivering each of said articles to a predetermined one of said palletizing stations.

9. A conveyor warehousing system as defined by claim 8 further including a plurality of replenishment storage racks extending in spaced parallel relationship with each of said storage racks and defining therewith a vehicle aisle.

10. A conveyor warehousing system as defined by claim 9 wherein each of said modular conveyor means further includes a plurality of intermediate transfer conveyors, each of said transfer conveyors extending from a respective one of said picking conveyors to one of said accumulator conveyors.

11. A conveyor warehousing system as defined by claim 10 further including a decline conveyor receiving a batched order from said merge conveyor, and wherein said sortation conveyor includes a powered conveyor section receiving a batched order from said decline conveyor;

a plurality of diverter means for diverting selected articles from said batched order off of said powered section; and a plurality of discharge conveyors each positioned adjacent one of said diverter means to receive articles diverted by said diverter means.

12. A conveyor warehousing system as defined by claim 11 wherein one of said palletizing stations is positioned ajacent each of said discharge conveyors and said palletizing stations each include a worker platform, a storage area for pallets, and a vertical lift for transporting a pallet from said worker platform to a pallet run out conveyor, said pallet run out conveyor delivering a loaded pallet to said selected loading area.

13. A conveyor warehousing system as defined by claim 12 further including a meter belt conveyor between each of said accumulators and said merge conveyor.

* * * * *

UNITED STATES PATENT AND TRADEMARK OFFICE
CERTIFICATE OF CORRECTION

PATENT NO. : 4,189,273
DATED : February 19, 1980
INVENTOR(S) : Edward C. Soderstrom et al It is certified that error appears in the above-identified patent and that said Letters Patent are hereby corrected as shown below:

Column 1, line 44:

"is" should be --to--;

Column 3, line 17:

"be" should be --by--;

Column 6, line 5:

"are" should be --a--;

Column 6, line 53:

"meter 16" should be --meter belt 16--.

Signed and Sealed this

Twenty-second Day of July 1980

[SEAL]

Attest:

SIDNEY A. DIAMOND

Attesting Officer

Commissioner of Patents and Trademarks